United States Patent
Huang (10) Patent No.: US 8,572,853 B2
(45) Date of Patent: Nov. 5, 2013

(54) GARDEN SHEARS

(75) Inventor: Yao-Chung Huang, Fu Shing Hsiang (TW)

(73) Assignee: Ho Cheng Garden Tools Co., Ltd., Chang Hua Hsien (TW)

( * ) Notice: Subject to any disclaimer, the term of this patent is extended or adjusted under 35 U.S.C. 154(b) by 508 days.

(21) Appl. No.: 12/969,600

(22) Filed: Dec. 16, 2010

(65) Prior Publication Data

US 2012/0151781 A1   Jun. 21, 2012

(51) Int. Cl.
*B26B 13/00* (2006.01)

(52) U.S. Cl.
USPC .............................................. 30/239; 30/266

(58) Field of Classification Search
USPC .................................... 30/258, 239, 266, 267
See application file for complete search history.

(56) References Cited

U.S. PATENT DOCUMENTS

| | | | | |
|---|---|---|---|---|
| 31,849 A | * | 3/1861 | Knapp | |
| 280,047 A | * | 6/1883 | Kully | 30/259 |
| 460,704 A | * | 10/1891 | Hansen | 30/239 |
| 467,025 A | * | 1/1892 | Wreden | 30/239 |
| 556,644 A | * | 3/1896 | Rivard | 30/239 |
| 1,918,889 A | * | 7/1933 | Bacon | 606/207 |
| 2,093,987 A | * | 9/1937 | Wallace | 30/258 |
| 2,436,260 A | * | 2/1948 | Klenk | 30/239 |
| 2,816,359 A | * | 12/1957 | Benton et al. | 30/239 |
| 3,336,668 A | * | 8/1967 | Groom | 30/239 |
| 4,761,883 A | * | 8/1988 | Mertens | 34/239 |
| 2007/0163126 A1 | * | 7/2007 | Huang | 30/175 |
| 2009/0044412 A1 | * | 2/2009 | Hsieh | 30/252 |
| 2010/0223794 A1 | * | 9/2010 | Block et al. | 30/258 |
| 2011/0296694 A1 | * | 12/2011 | Huang | 30/254 |
| 2012/0186087 A1 | * | 7/2012 | Huang | 30/252 |
| 2012/0198705 A1 | * | 8/2012 | Huang | 30/244 |

* cited by examiner

*Primary Examiner* — Kenneth E. Peterson (57) ABSTRACT

A garden shears has a first shear, a second shear and two joined pressing arms. The first shear has a handle portion, and a positioned first pivot hole and an first eccentric pivot hole. The second shear has an elliptical second pivot hole, and a sidewall of the second pivot hole has a limiting surface. A sliding slot is disposed on the second shear, and a limiting indentation is disposed along an outer sidewall between the second pivot hole and the sliding slot, with a second cutting portion extending from an upper section of the second shear. The two joined pressing arms respectively have a connecting rod at a lower section and an Z-shaped upper section; an elliptical engaging pivot hole is disposed on each arm, and a third pivot hole is disposed at the upper section and used to be engaged with a first spacer.

2 Claims, 13 Drawing Sheets

GARDEN SHEARS

BACKGROUND OF THE INVENTION

1. Field of the Invention

The present invention relates to garden shears, and more particularly to garden shears that provide a smooth cutting operation and an alternative cutting option.

2. Description of the Related Art

More and more people enjoy having plants around; therefore, garden tools are becoming increasingly popular. Garden shears are used for trimming plants. Please refer to FIG. 9-FIG. 13. Prior art garden shears have a first shear 10, a second shear 20 and a pressing arm 30 combined by securing members. The first shear 10 has a handle 11 at a lower portion, a first center pivot hole 12 at a middle portion, an eccentric pivot hole 13 below the center pivot hole 12 and an anvil 14 at an upper portion. The second shear 20 has a second center pivot hole 21 at a middle portion, an adjustable aperture 22 at a lower portion, and a blade 23 at an upper portion. The pressing arm 30 has a handle 31 at a lower portion, an engaging pivot hole 32 at a middle portion, and a combining pivot hole 33 at an upper portion.

Figure 9:
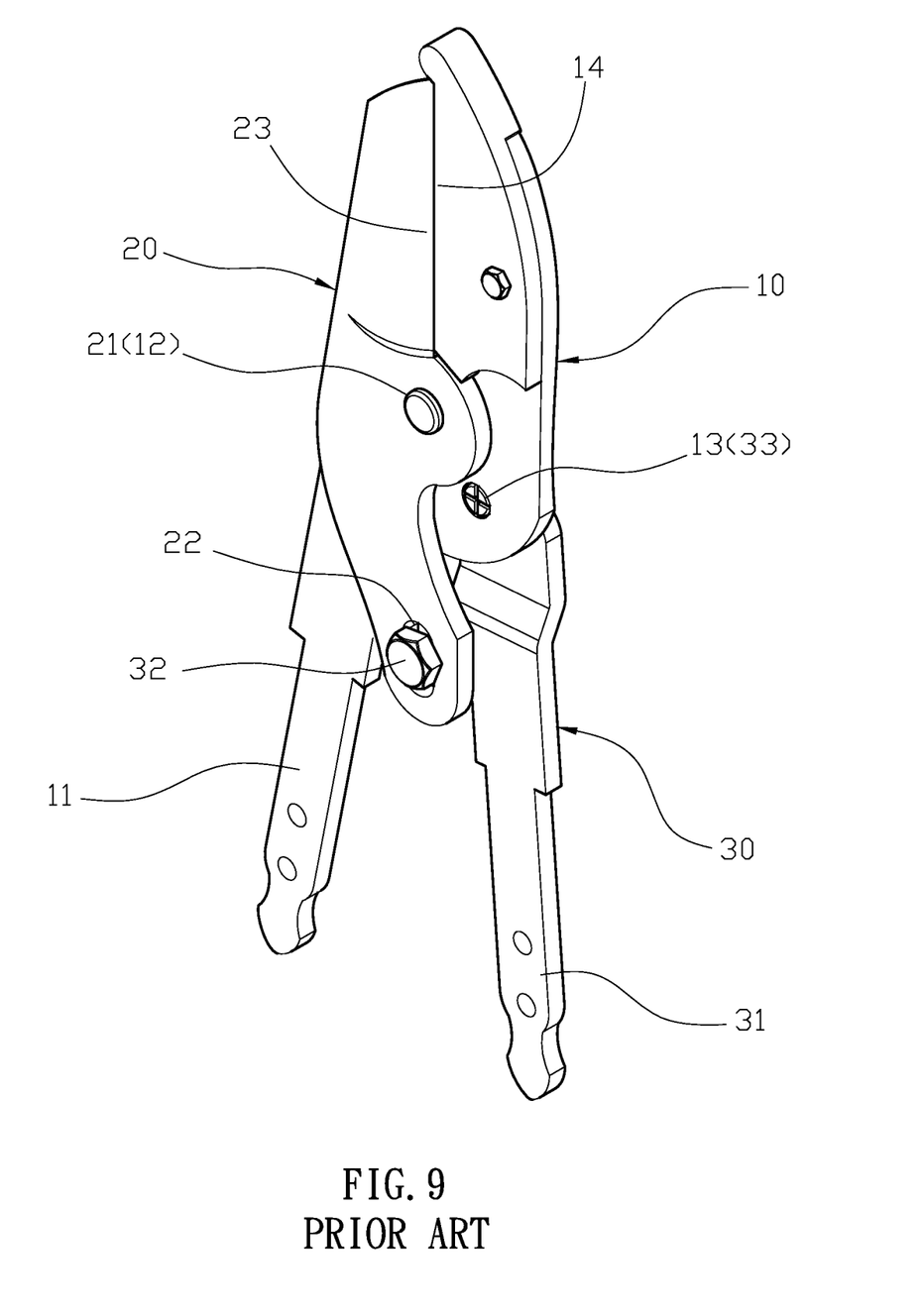
FIG. 9 is a perspective view of a prior art device.
Figure 10:
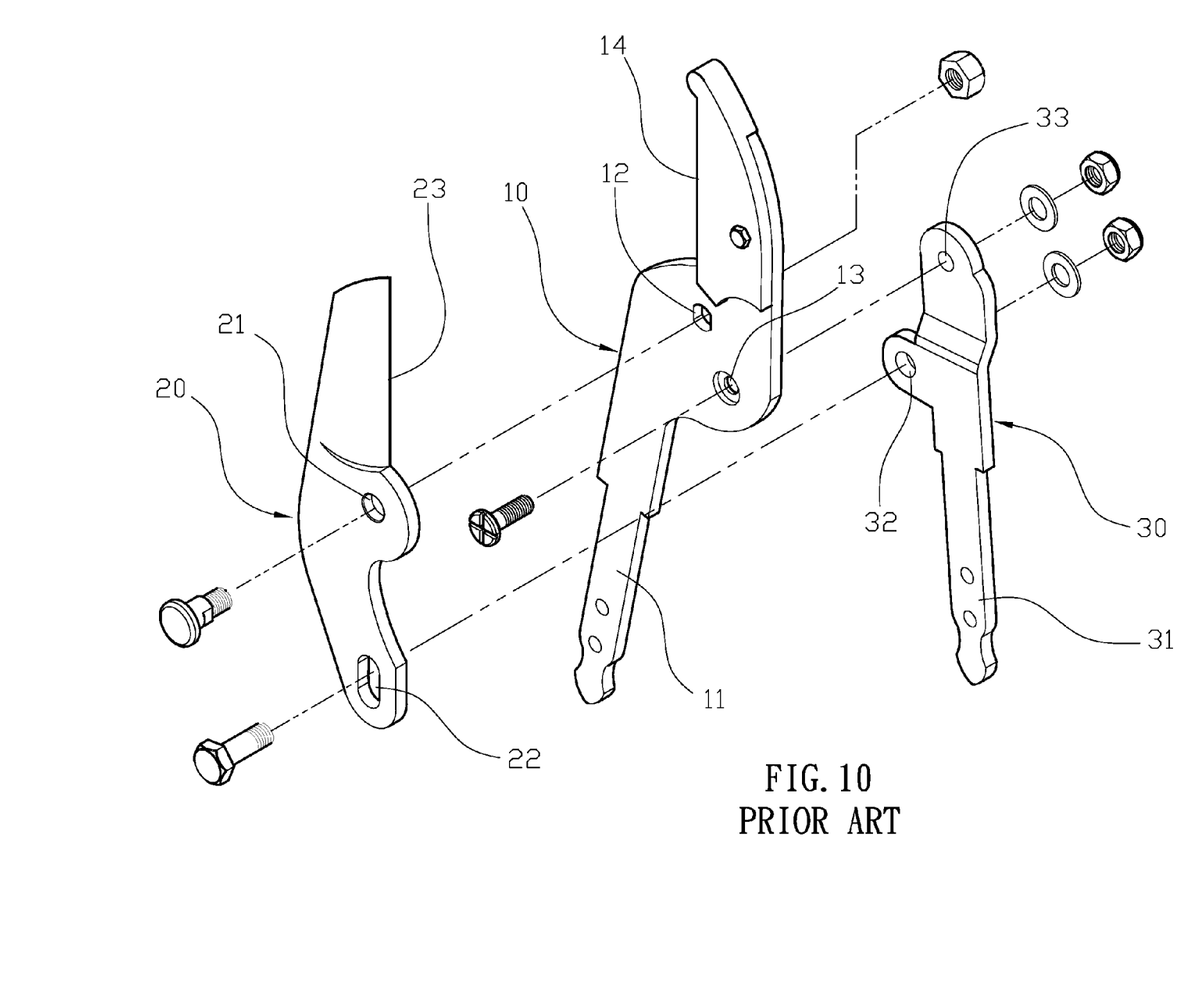
FIG. 10 is an exploded view of the prior art.
Figure 11:
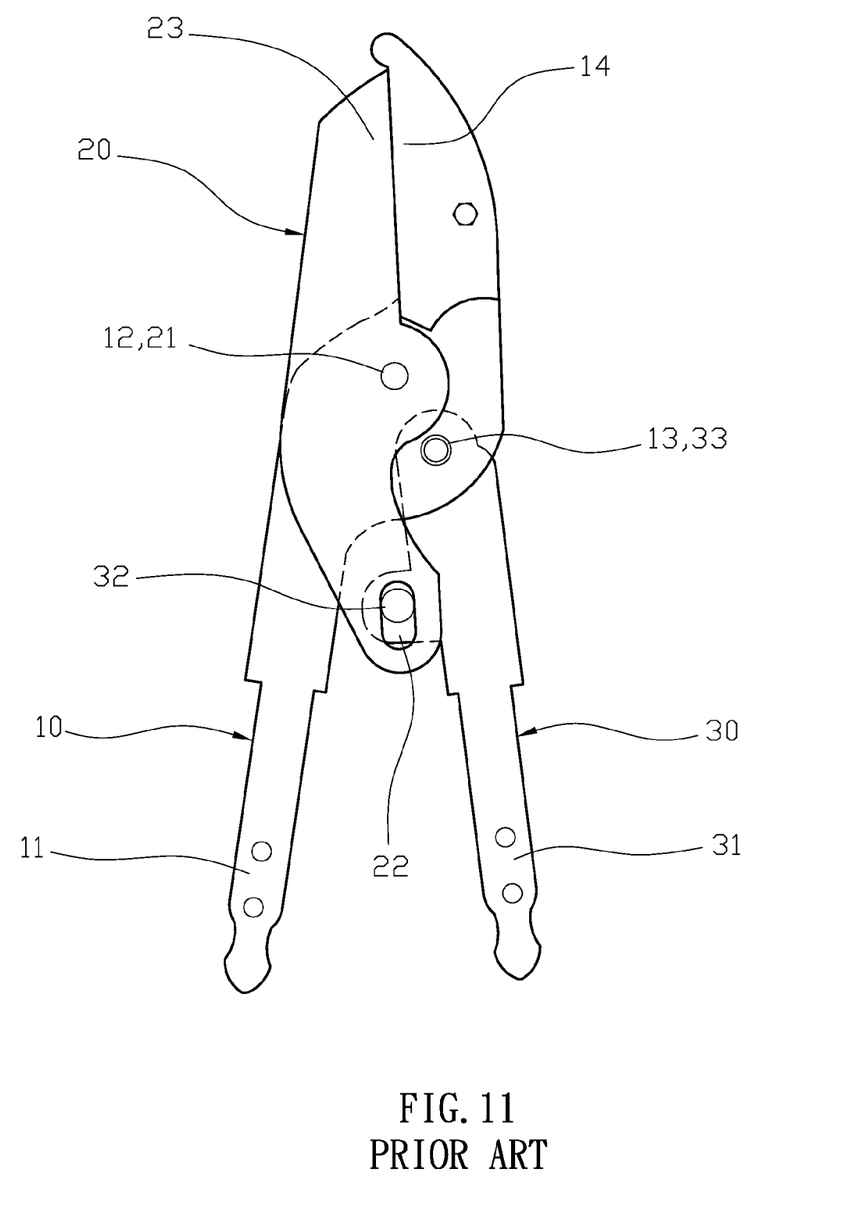
FIG. 11 is a front view of the prior art.

For assembly, the first shear 10 and the second shear 20 partially overlap each other; the first and second center pivot holes 12, 21 are combined by a suitable bolt and nut to form a center pivot axis, and the anvil 14 and the blade 23 are closed together. The pressing arm 30 utilizes the combining pivot hole 33 for pivoting onto the eccentric pivot hole 13 of the first shear 10 with a bolt and nut, and the engaging pivot hole 32 is also pivoted with the adjustable aperture 22 of the second shear 20 with securing members such that the pressing arm 30 is capable of moving along the adjustable aperture 22 with movement of the first shear 10 and the second shear 20.

Figure 12:
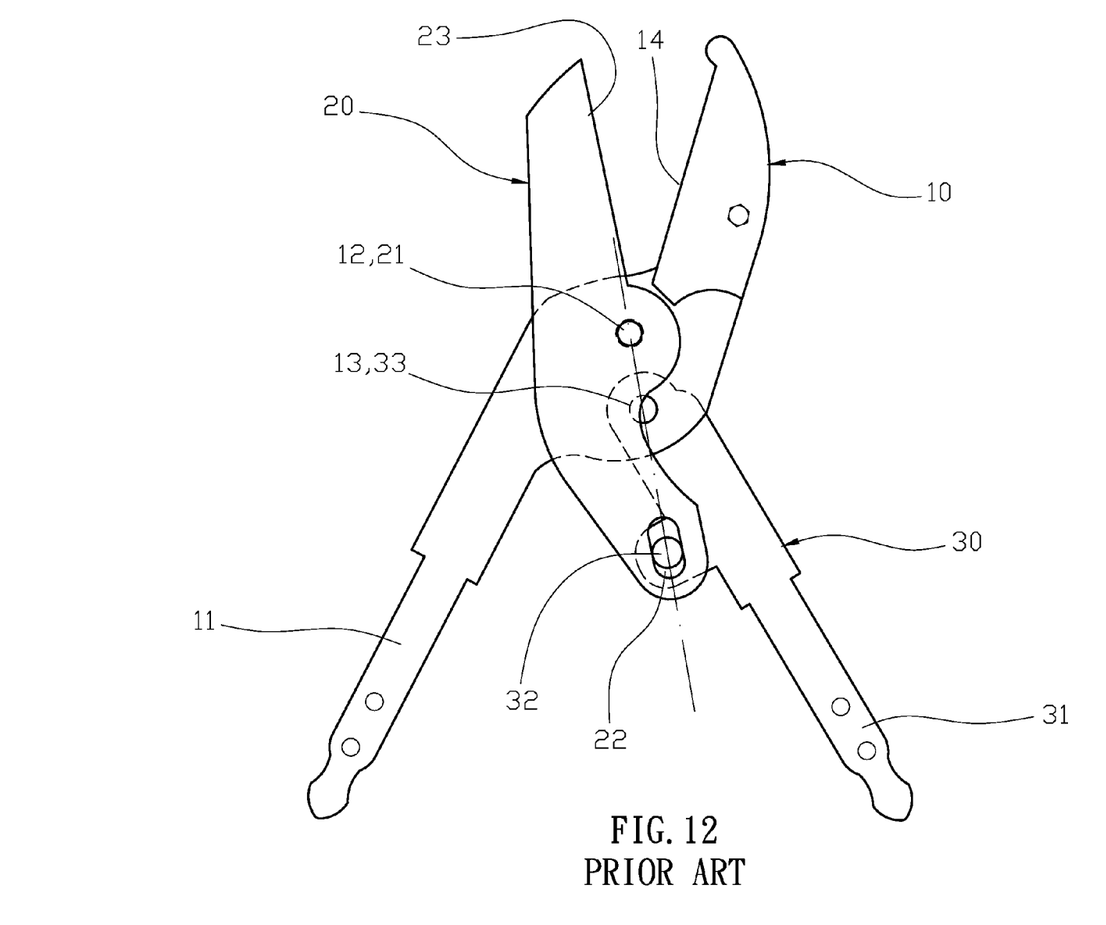
FIG. 12 is an operation schematic drawing showing the prior art half opened.
Figure 13:
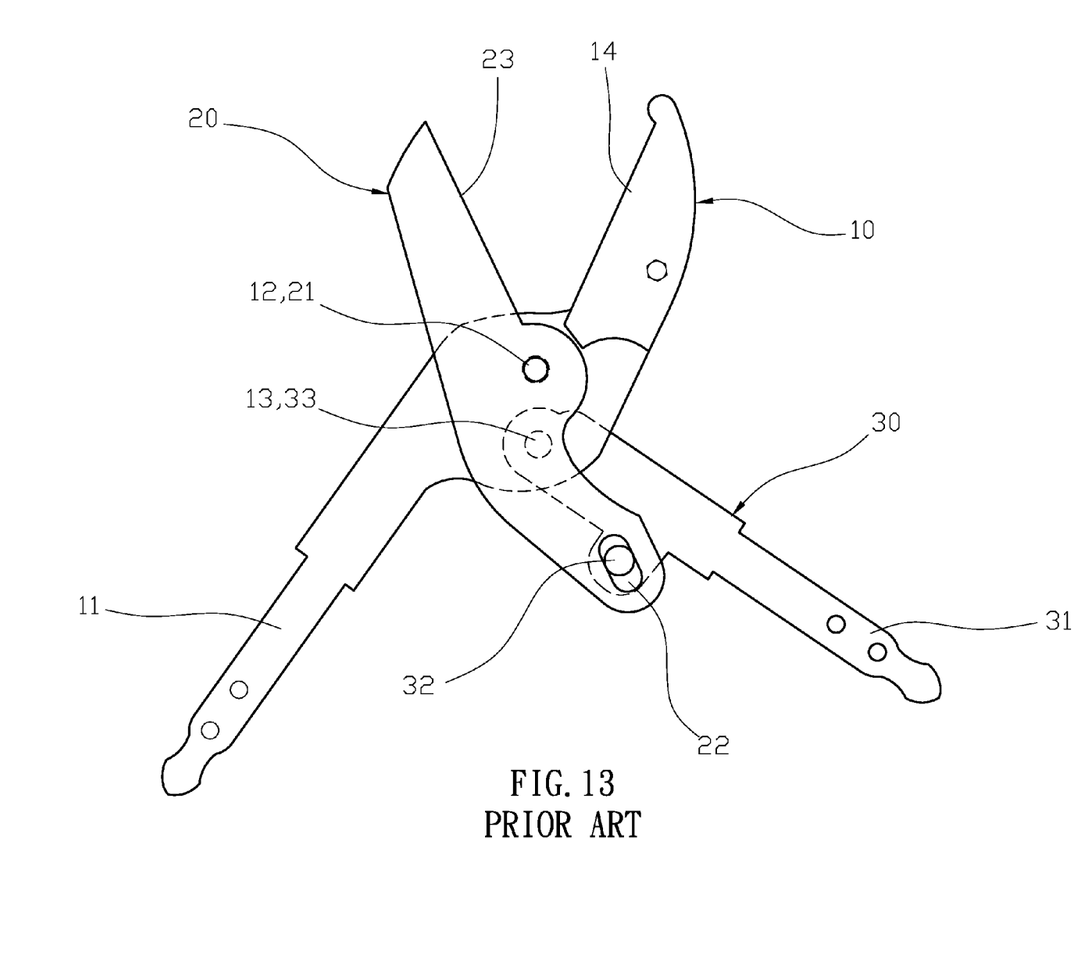
FIG. 13 is a drawing showing the prior art completely opened.

Before use, the handle 11 of the first shear 10 and the pressing arm 30 are closed together, as shown in FIGS. 11, 12 and 13; the anvil 14 and the blade 23 are also closed together. In use, the handle 11 of the first shear 10 and the pressing arm 30 respectively rotate around the first and second center pivot holes 12, 21, the eccentric pivot hole 13 and the combining pivot hole 33 to open apart, and a distance between the center pivot hole 21 of the second shear 20 and the combining pivot hole 33 of the pressing arm 30 becomes shorter. When the first shear 10 and the pressing arm 30 are opened apart, the pressing arm 30 utilizes the engaging pivot hole 32 to drive the adjustable aperture 22 of the second shear 20 such that the anvil 14 and the blade 23 are opened to form a cutting angle. Furthermore, since the second shear 20 and the pressing arm 30 are not on the same center pivoting point, an offset is generated, and the engaging pivot hole 32 moves from above the adjustable aperture 22 downwardly. However, when the first and second center pivot holes 12, 21, and the combining pivot hole 33 with the engaging pivot hole 32 are aligned in a straight line, a maximum cutting range is provided. Therefore, the prior art structure has the following drawbacks: 1. The prior art structure has a smaller cutting ranger; the opening formed by the anvil 14 and the blade 23 of the first shear 10 and the second shear 20 is limited such that the size of a target object is limited too. 2. The adjustable aperture 22 only provides adjustment when the distance between the first and second center pivot hole 21, 12 and the combining pivot hole 33 with the engaging pivot hole 32 are changed, which is not very effective and cannot increase the opening formed by the anvil 14 and the blade 23. 3. Moreover, the prior art structure can only provide one cutting option.

Therefore, it is desirable to provide garden shears to mitigate and/or obviate the aforementioned problems.

SUMMARY OF THE INVENTION

An objective of the present invention is to provide garden shears.

In order to achieve the above-mentioned objectives an embodiment of garden shears comprises: a first shear, a second shear and two joined pressing arms. The first shear has a handle portion offset from a first cutting portion of the first shear, and a central portion of the first shear has a centrally positioned first pivot hole and an first eccentric pivot hole offset from and below the first pivot hole. The first cutting portion is coupled to the upper portion of the first shear, and the first cutting portion is a blade or an anvil. The second shear has an elliptical second pivot hole at a middle section, and a sidewall of the second pivot hole has a limiting surface with embossed patterns. A sliding slot is disposed in a lower section of the second shear, and a limiting indentation is disposed along an outer sidewall between the second pivot hole and the sliding slot, with a second cutting portion extending from an upper section of the second shear. The second cutting portion is a blade or an anvil. The two joined pressing arms respectively have a connecting rod at a lower section and an Z-shaped upper section; an elliptical engaging pivot hole is disposed in a lower portion of each arm, and a third pivot hole is disposed at an upper portion of the Z-shaped upper section and used to engage with a first spacer. The second pivot hole of the second shear is pivoted with the first pivot hole of the first shear with matching screws to form a center pivot axis, and the limiting surface with embossed patterns of the second pivot hole provides positioning and limiting functions. The two joined pressing arms are respectively installed on the two sides of the first shear and cover the second shear, and the two joined pressing arms utilize the third pivot hole for pivoting onto the eccentric pivot hole of the first shear with matching securing members to form a first pivot point; the first spacer is placed between the two joined pressing arms and pushes against the limiting slot on one side of the second shear to form a stopping region; the engaging pivot hole at the middle section of the pressing arm is pivoted onto the sliding slot of the second shear with matching securing members to form a second pivot point, the sliding slot further providing a second spacer pivoted with the engaging pivot hole such that the second spacer engages with the sliding slot and moves along with the engaging pivot hole.

The above-mentioned structure has following benefits:

1. For the same movements, the opened first and second cutting portions have a wider cutting range for a larger target object.

2. The connections among the first pivot hole and the second pivot hole, the eccentric pivot hole and the third pivot hole, and the engaging pivot hole form triangles. Moreover, during the cutting movements, the further the device cuts, the engaging pivot hole moves along the sliding slot to increases the distance between the first pivot hole 42 and the second pivot hole for greater torque.

3. One of the embodiments of the present invention can be adjusted for performing a partial cutting operation, for grafting purposes or decoration purposes.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
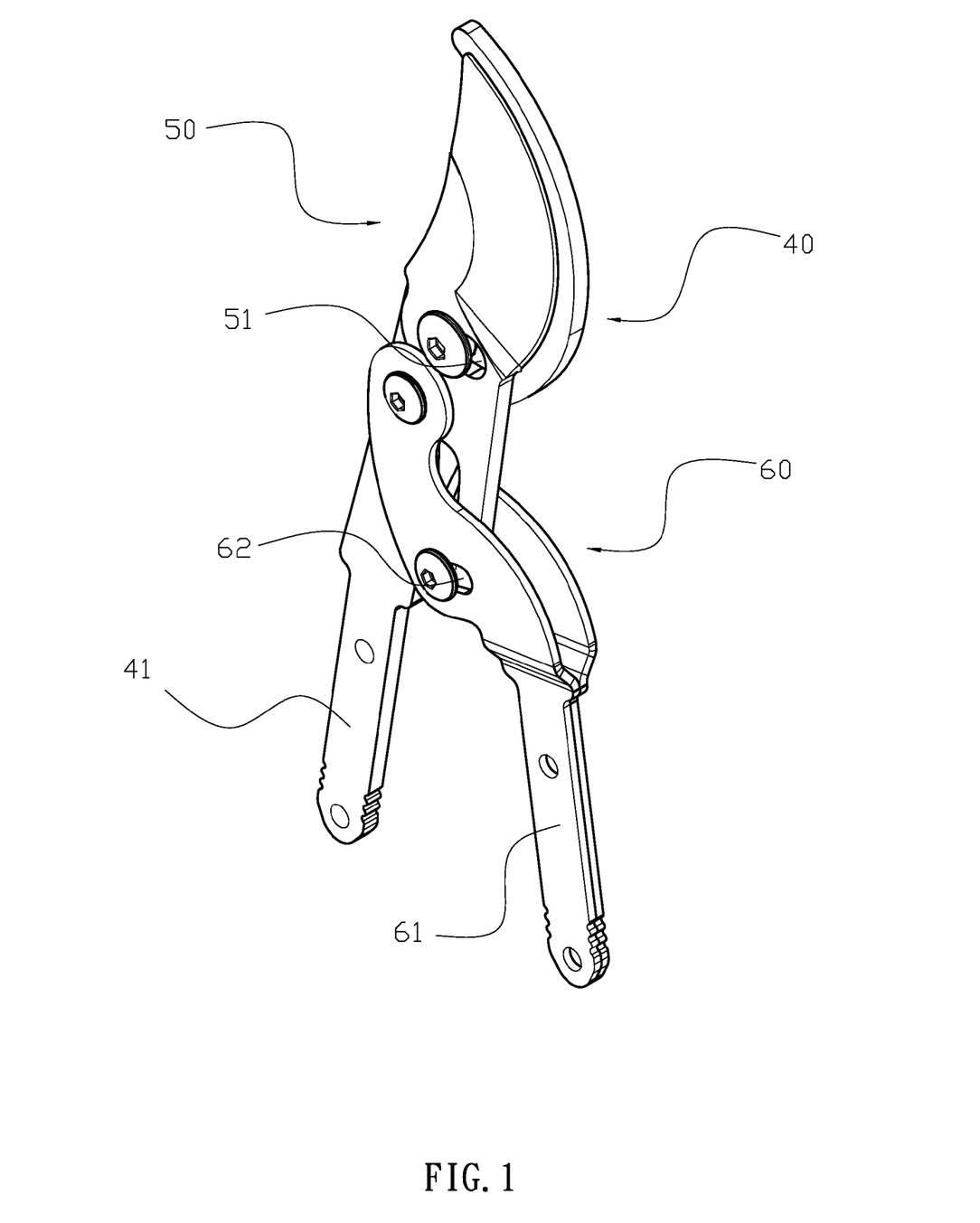
FIG. 1 is a perspective view of an embodiment of the present invention.
Figure 2:
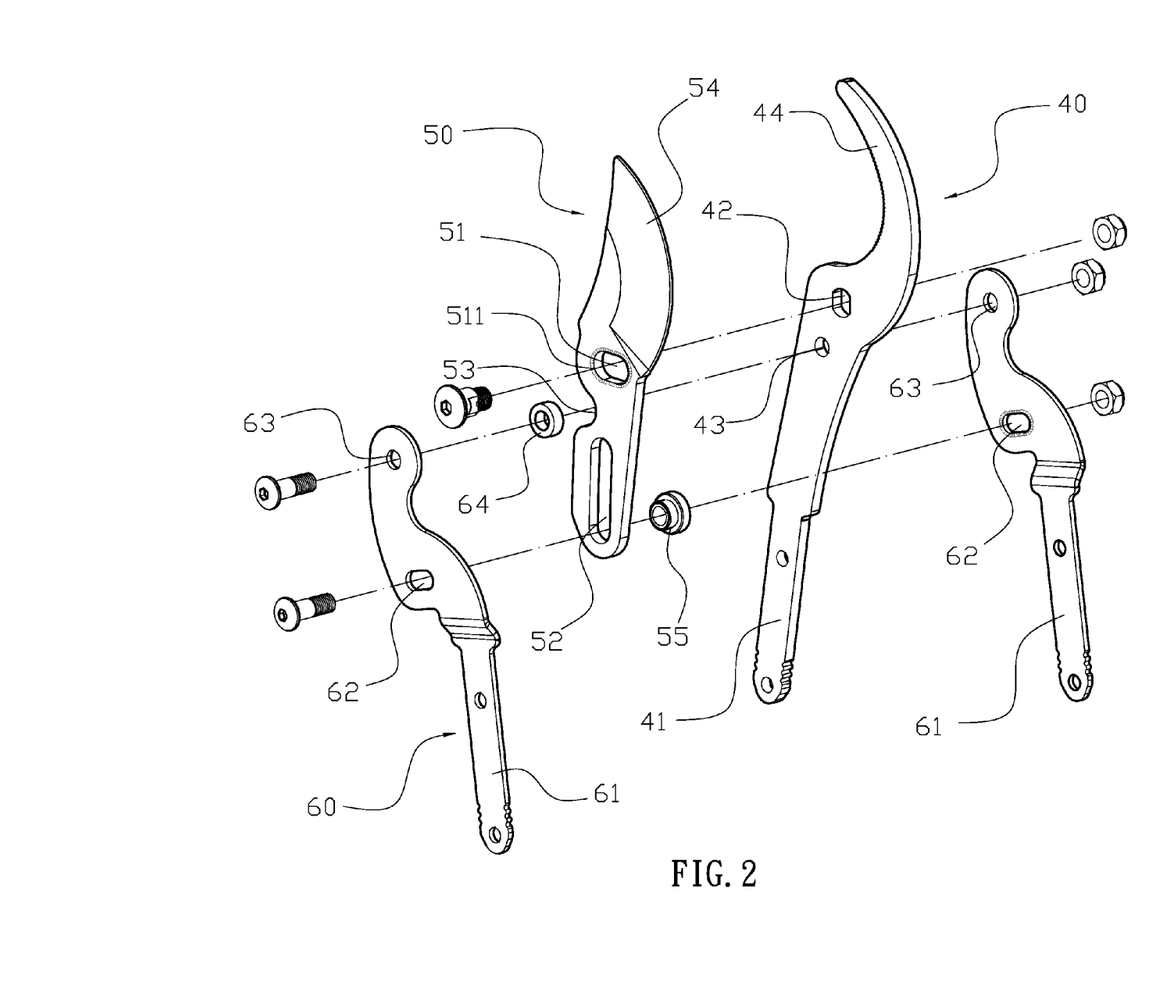
FIG. 2 is an exploded view of the embodiment of the present invention.

First, please refer to FIG. 1 and FIG. 2. An embodiment garden shears comprises: a first shear 40, a second shear 50 and two joined pressing arms 60. The first shear 40 has a handle portion 41 offset from a first cutting portion 44 of the first shear 40, and a central portion of the first shear 40 has a centrally positioned first pivot hole 42 and an first eccentric pivot hole 43 offset from and below the first pivot hole 42. The first cutting portion 44 is coupled to the upper portion of the first shear 40, and the first cutting portion 44 is a blade or an anvil. The second shear 50 has an elliptical second pivot hole 51 at a middle section, and a sidewall of the second pivot hole 51 has a limiting surface 511 with embossed patterns. A sliding slot 52 is disposed in a lower section of the second shear 50, and a limiting indentation 53 is disposed along an outer sidewall between the second pivot hole 51 and the sliding slot 52, with a second cutting portion 54 extending from an upper section of the second shear 50. The second cutting portion 54 is a blade or an anvil. The two joined pressing arms 60 respectively have a connecting rod 61 at a lower section and an Z-shaped upper section; an elliptical engaging pivot hole 62 is disposed in a lower portion of each arm 60, and a third pivot hole 63 is disposed at an upper portion of the Z-shaped upper section and used to be engaged with a first spacer 64.

Figure 3:
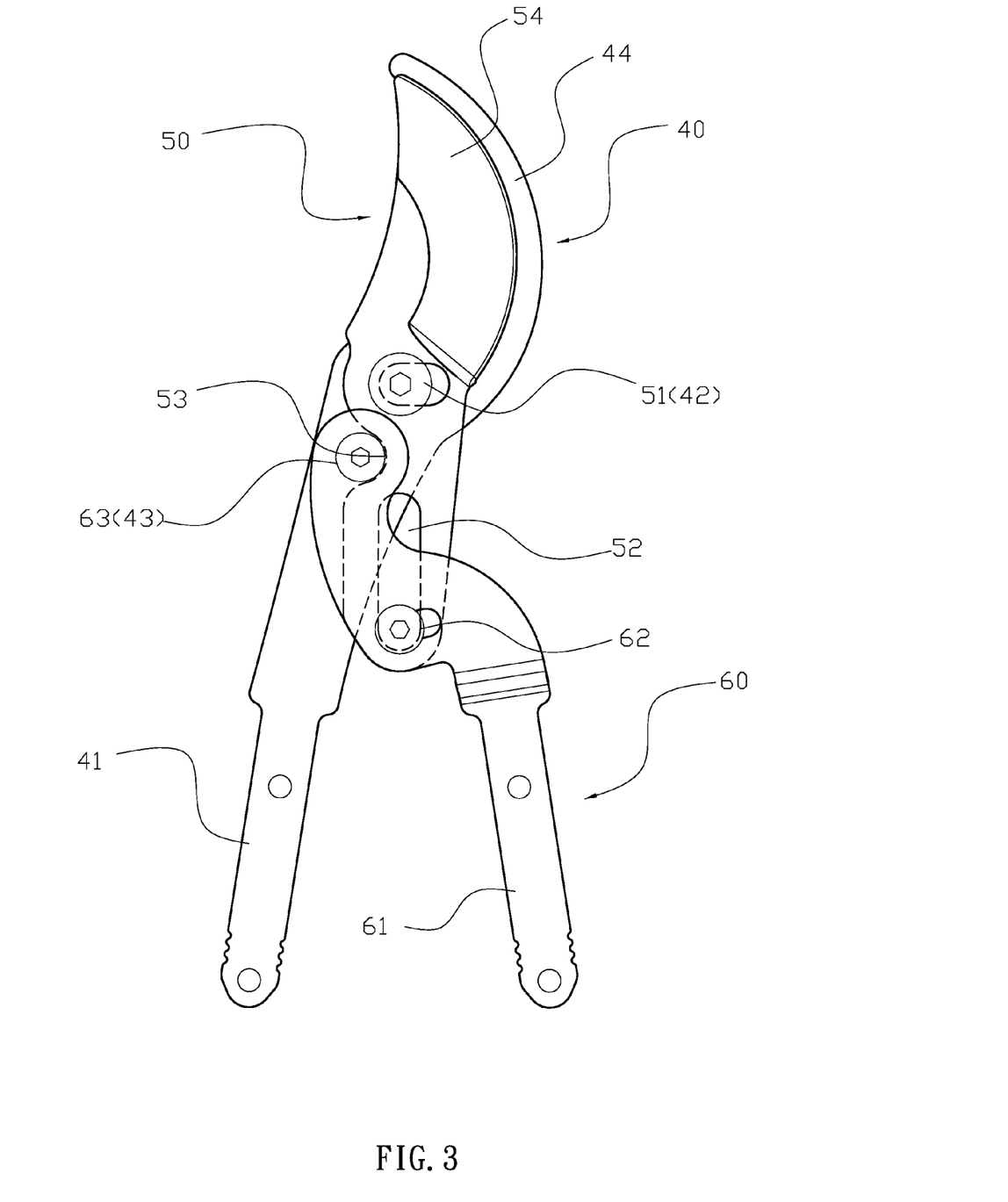
FIG. 3 is a front view of the embodiment of the present invention.
Figure 4:
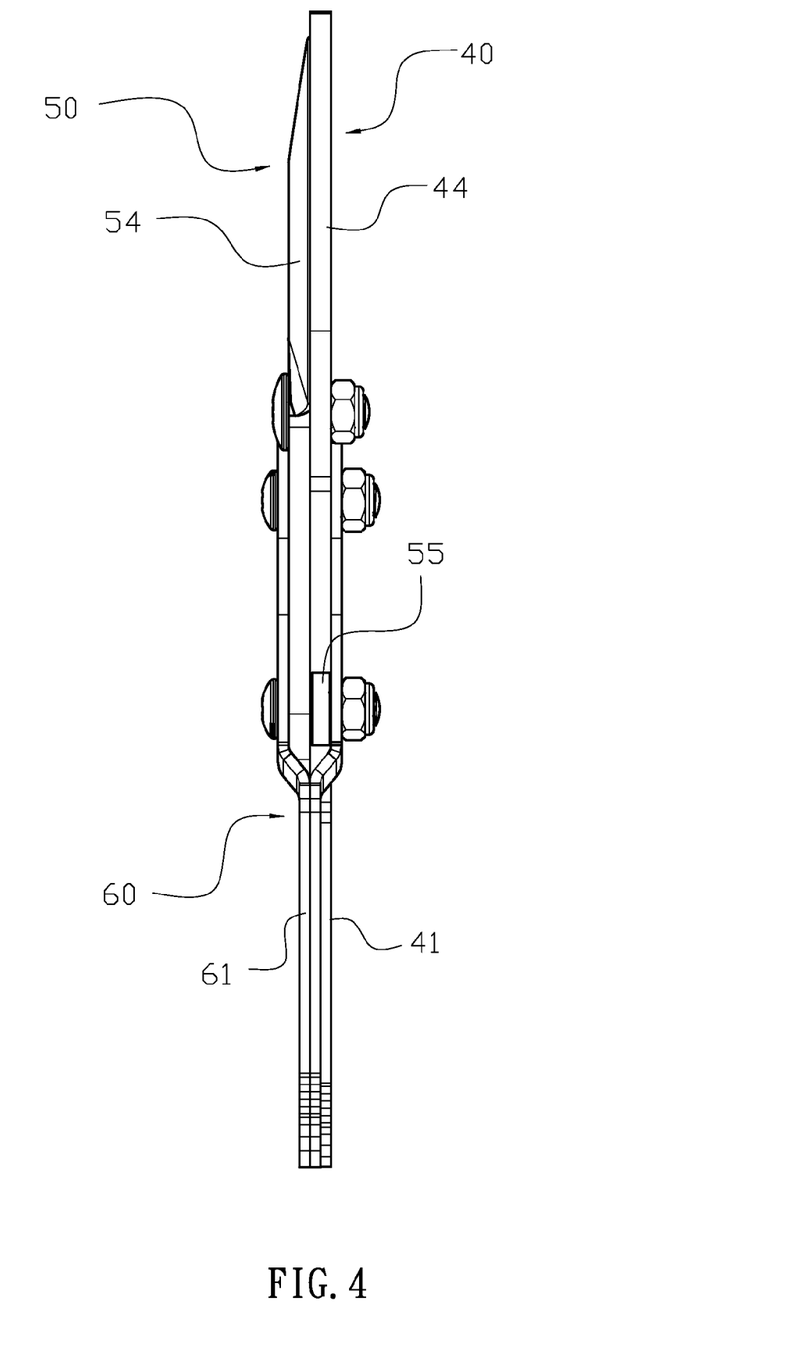
FIG. 4 is a side view of the embodiment of the present invention.

As shown in FIGS. 2, 3 and 4. The second pivot hole 51 of the second shear 50 is pivoted with the first pivot hole 42 of the first shear 40 with matching screws to form a center pivot axis, and the limiting surface 511 with embossed patterns of the second pivot hole 51 provides positioning and limiting functions. The two joined pressing arms 60 are respectively installed on the two sides of the first shear 40 and cover the second shear 50, and the two joined pressing arms 60 utilize the third pivot hole 63 for pivoting onto the eccentric pivot hole 43 of the first shear 40 with matching securing members to form a first pivot point. The first spacer 64 is placed between the two joined pressing arms 60 and pushes against the limiting indentation 53 on the side of the second shear 50 to form a stopping region and to reduce friction. The engaging pivot hole 62 at the middle section of the pressing arm 60 is pivoted onto the sliding slot 52 of the second shear 50 with matching securing members to form a second pivot point. The sliding slot 52 further utilizes a second spacer 55 pivoted with the engaging pivot hole 62 such that the second spacer 55 engages with the sliding slot 52 and moves along with the engaging pivot hole 62.

Figure 5:
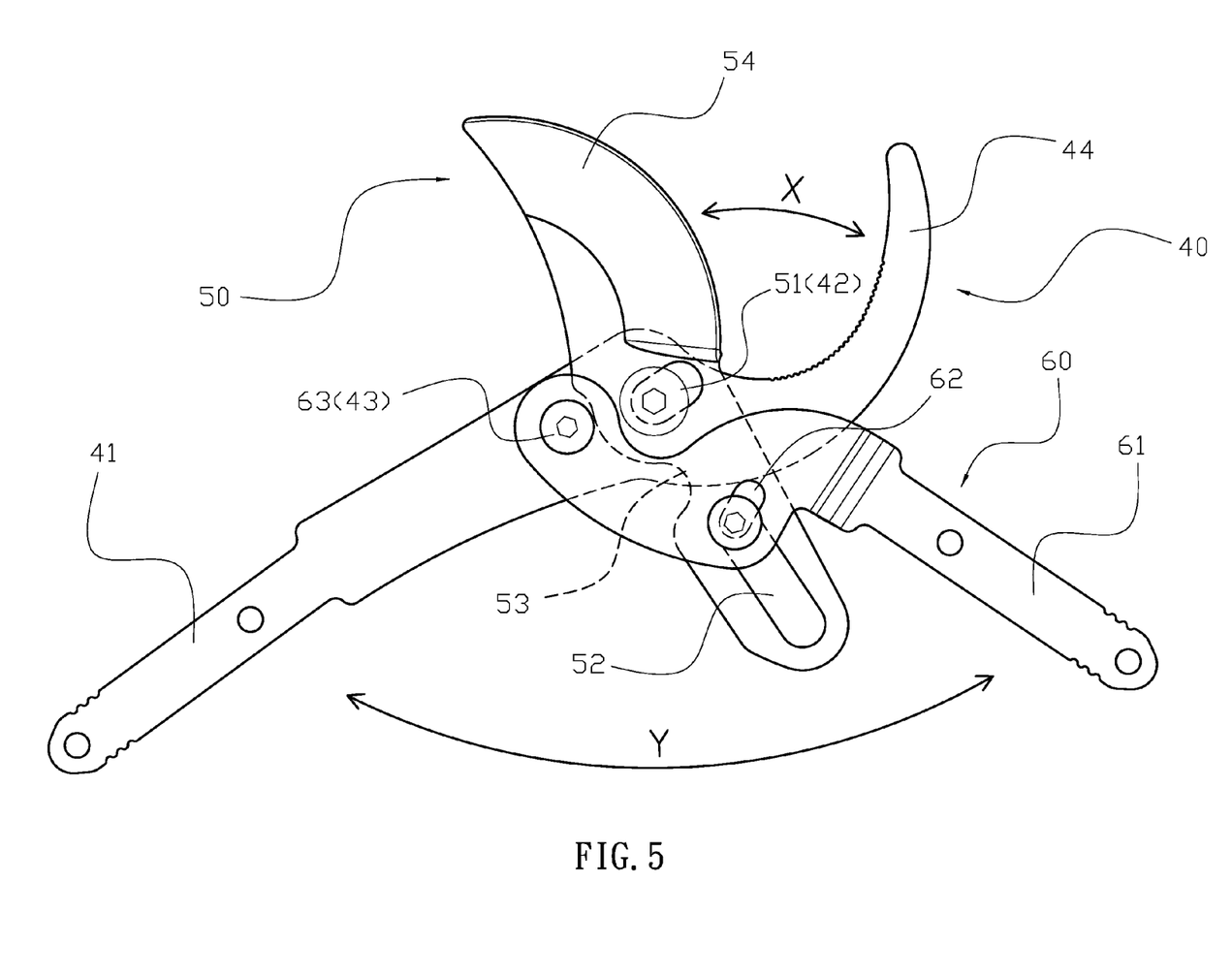
FIG. 5 is a schematic drawing showing the embodiment of the present invention in an opened state.
Figure 6:
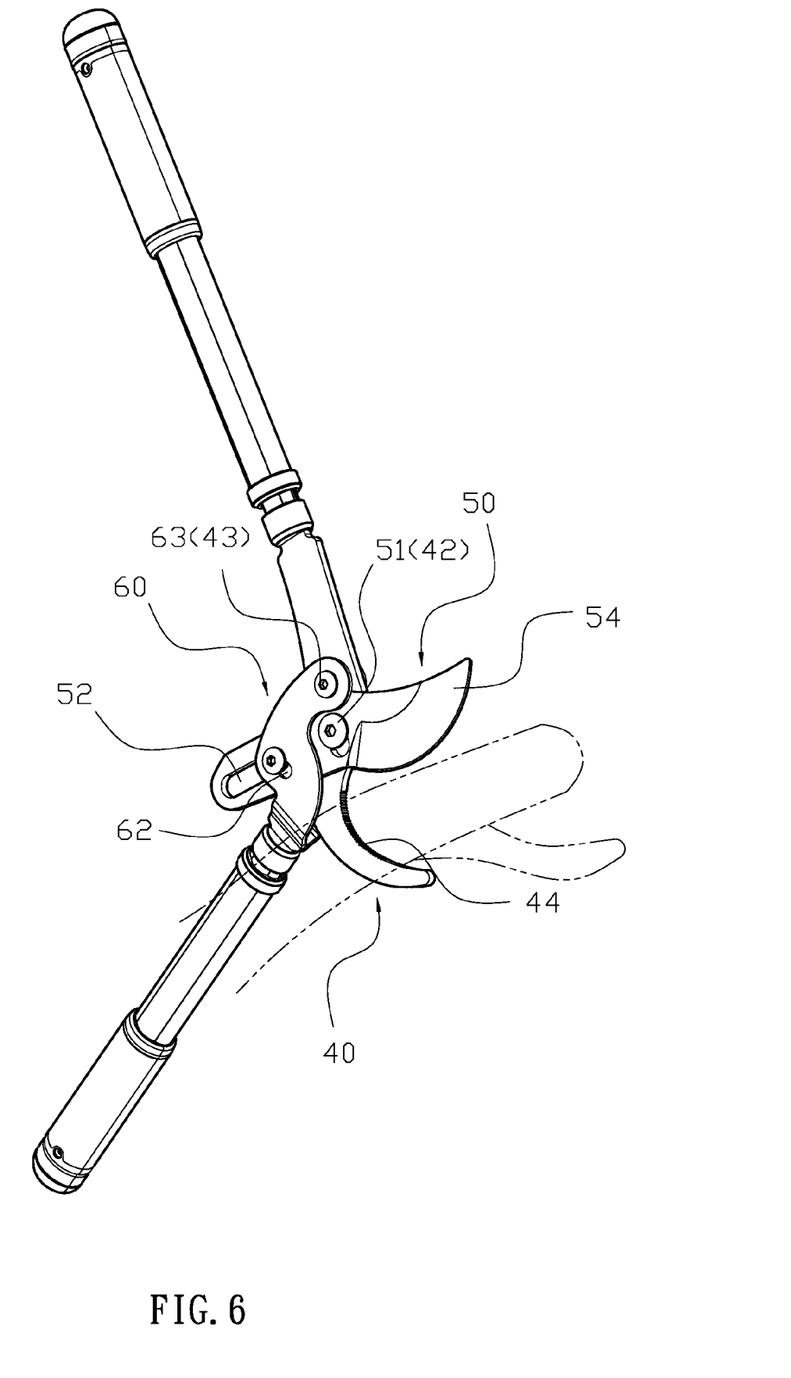
FIG. 6 is a schematic drawing showing movement of the embodiment of the present invention.

For actual operations please refer to FIG. 3 and FIG. 5. Before use, the first shear 40 and the pressing arm 60 are closed together, and the first and second cutting portions 44, 54 of the first shear 40 and the second shear 50 are closed together as well. The engaging pivot hole 62 of the pressing arm 60 and the second spacer 55 are located at the very bottom end of the sliding slot 52. When in operation, the first shear 40 and the pressing arm 60 are respectively rotated around the center pivot axis formed by the first pivot hole 42 and the second pivot hole 51 and the first pivot point formed by the eccentric pivot hole 43 and the third pivot hole 63, such that the first shear 40 and the second shear 50 are driven to open for cutting. When the handle 41 of the first shear 40 and the connecting rod 61 of the pressing arm 60 are opened away from each other, the eccentric pivot hole 43 and the third pivot hole 63 at the center pivot axis stay at the same positions, and the engaging pivot hole 62 rotates around the third pivot hole 63 as the first pivot point to drive the first shear 40 and the second shear 50 to open the first and second cutting portions 44, 54. When the pressing arm 60 is rotated more outwardly, the engaging pivot hole 62 moves upwardly in the sliding slot 52 to be close to the first pivot hole 42 and the second pivot hole 51 of the first shear 40 and the second shear 50 at the center pivot axis so that the first and second cutting portions 44, 54 of the first shear 40 and the second shear 50 are opened further. For cutting operations, please refer to FIG. 6. When the first and second cutting portions 44, 54 are driven to open to a maximum extent the engaging pivot hole 62 is located at the very top end of the sliding slot 52, a distance between the first pivot hole 42 and the second pivot hole 51 and the engaging pivot hole 62 is at a minimum, and so the second shear 50 and the first shear 40 can provide a good cutting effect. When the cutting angle is smaller, the distance between the first pivot hole 42 and the second pivot hole 51 and the engaging pivot hole 62 is longer, which provides a greater leverage force and requires less strength in operation. Therefore, when the first and second cutting portions 44, 54 are opened to the maximum extent to cut a larger branch, in the beginning the first and second cutting portions 44, 54 require little strength to cut partially into the branch; but then more strength is required to make the blade cut into the branch deeper due to the greater friction between the branch and the blade, and the engaging pivot hole 62 can be moved closer to the bottom end of the sliding slot 52 to elongate its arm length to provide more cutting force with the same applied strength.

Figure 7:
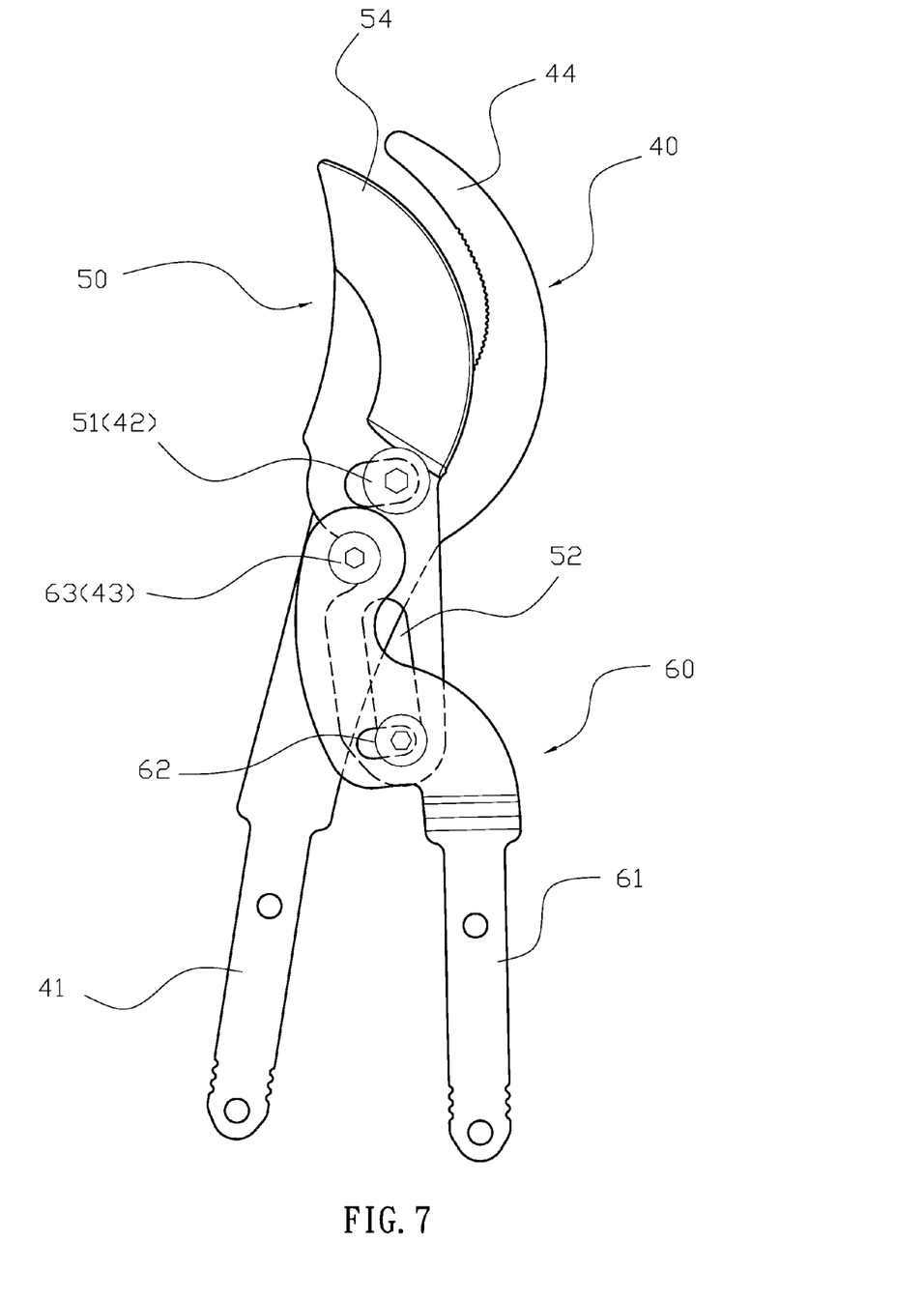
FIG. 7 is a schematic drawing of another embodiment of the present invention.
Figure 8:
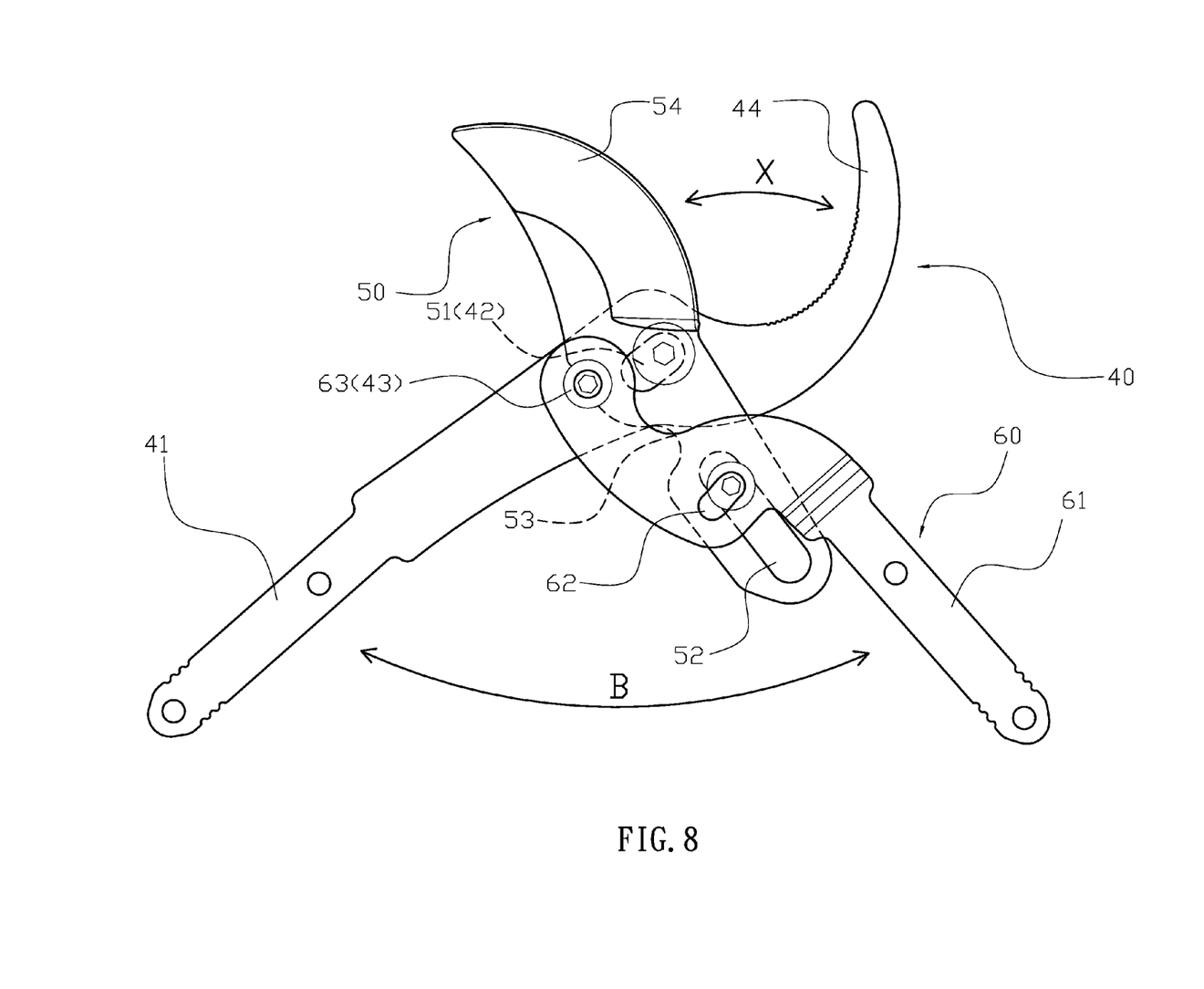
FIG. 8 is a schematic drawing of another embodiment of the present invention.

For another embodiment, please refer to FIG. 7 and FIG. 8. The second pivot hole 51 and the engaging pivot hole 62 of the second shear 50 and the pressing arm 60 are respectively elliptical holes, therefore the first pivot hole 42 of the first shear 40, the third pivot hole 63 of the pressing arm 60 and the matching securing members are moved to another side of the second pivot hole 51 and then the securing member is tightened to lock into place. The sliding slot 52 of the second shear 50 is also moved with the securing members to another side of the engaging pivot hole 62 and then the securing member is tighten to lock into place. When the handle 41 of the first shear 40 and the connecting rod 61 of the pressing arm 60 are closed together, a gap is formed between the first and second cutting portions 44, 54 of the first shear 40 and the second shear 50; therefore, the target object needing to be cut can be still be partially attached instead of being cut off completely. If the user needs to cut off the target object completely, the securing members can be loosened and moved for that purpose.

The above-mentioned structure has following benefits:

1. For the same movements, the opened first and second cutting portions 44, 54 have a wider cutting range for a larger target object.

2. The connections among the first pivot hole 42 and the second pivot hole 51, the eccentric pivot hole 43 and the third pivot hole 63, and the engaging pivot hole 62 form triangles. Moreover, during the cutting movements, the further the device cuts, the engaging pivot hole 62 moves along the sliding slot 52 to increases the distance between the first pivot hole 42 and the second pivot hole 51 for greater torque.

3. One of the embodiments of the present invention can be adjusted for performing a partial cutting operation, for grafting purposes or decoration purposes.

Although the present invention has been explained in relation to its preferred embodiment, it is to be understood that many other possible modifications and variations can be made without departing from the spirit and scope of the invention as hereinafter claimed.

What is claimed is:

1. A garden shears comprising:
   a first shear, a handle portion of the first shear offset from a first cutting portion of the first shear, and a central portion of the first shear comprising a centrally positioned first pivot hole and an first eccentric pivot hole offset from and below the first pivot hole, the first cutting portion coupled to the upper portion of the first shear;
   a second shear having an elongate second pivot hole at a middle section, and a sidewall of the second pivot hole having a limiting surface with embossed patterns; a sliding slot disposed in a lower section of the second shear, a limiting slot disposed in an outer sidewall between the second pivot hole and the sliding slot, and a cutting portion extending from an upper section; and
   two joined pressing arms respectively having a connecting rod at a lower section and a zigzag upper section, an elongate engaging pivot hole disposed at a lower portion of the zigzag upper section, a third pivot hole disposed at an upper portion of the zigzag upper section, and a first spacer;
   wherein the second pivot hole of the second shear is pivoted with the first pivot hole of the first shear with a first screw to form a center pivot axis, and the limiting surface with embossed patterns of the second pivot hole provides positioning and limiting functions; wherein the two joined pressing arms are respectively installed on the two sides of the first shear and cover the second shear, and the two joined pressing arms utilize the third pivot hole for pivoting onto the eccentric pivot hole of the first shear with a second screw to form a first pivot point; the first spacer is placed between the two joined pressing arms and pushes against the limiting slot on one side of the second shear to form a stopping region; the engaging pivot hole at the middle section of the pressing arm is pivoted onto the sliding slot of the second shear with a third screw to form a second pivot point, the sliding slot further providing a second spacer pivoted with the engaging pivot hole such that the second spacer engages with the sliding slot and moves along with the engaging pivot hole.

2. The garden shears as claimed in claim 1, wherein the second cutting portion is a blade or an anvil.

\* \* \* \* \*